United States Patent
Cornell et al.

(10) Patent No.: US 10,515,248 B1
(45) Date of Patent: Dec. 24, 2019

(54) APPARATUS AND METHOD FOR UPDATING BARCODE READERS

(71) Applicant: Zebra Technologies Corporation, Lincolnshire, IL (US)

(72) Inventors: Andrew Cornell, East Northport, NY (US); Ke Zhang, Stony Brook, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/109,965

(22) Filed: Aug. 23, 2018

(51) Int. Cl.
*G06K 7/14* (2006.01)
*G06K 7/10* (2006.01)

(52) U.S. Cl.
CPC ....... G06K 7/1413 (2013.01); G06K 7/10722 (2013.01)

(58) Field of Classification Search
CPC .................. G06K 7/1413; G06K 7/10722
See application file for complete search history.

(56) References Cited

U.S. PATENT DOCUMENTS

| | | | | |
|---|---|---|---|---|
| 7,949,607 B2* | 5/2011 | Ito | ........................ | G06F 21/608 380/232 |
| 9,110,759 B2* | 8/2015 | Morley | ..................... | G06F 8/61 |
| 9,171,193 B1* | 10/2015 | Lexmond | ............. | G06K 7/0008 |
| 9,998,591 B2* | 6/2018 | Saito | ....................... | H04M 3/38 |
| 2012/0287460 A1* | 11/2012 | McMillin | ........... | H04N 1/00204 358/1.15 |
| 2018/0349974 A1* | 12/2018 | Dutta | ................. | G06Q 30/0623 |

* cited by examiner

*Primary Examiner* — Seung H Lee
(74) *Attorney, Agent, or Firm* — Yuri Astvatsaturov

(57) ABSTRACT

An apparatus and method for updating features on an image scanning apparatus has a client computing device capture and decode an image of a first symbol that encodes data that identifies the image scanning apparatus, request a server to enable a feature on the image scanning apparatus, receive activation data from the server to enable the feature, and generate an image of a second symbol on a display of the client computing device that encodes the activation data. The image scanning apparatus captures and decodes an image of the second symbol, and uses the decoded activation data to enable a feature resident on the image scanning apparatus or to request a download of the feature from the client computing device if the feature is not resident on the image scanning apparatus. The client computing device downloads the feature from the server, and uploads the feature to the image scanning apparatus.

21 Claims, 6 Drawing Sheets

APPARATUS AND METHOD FOR UPDATING BARCODE READERS

BACKGROUND OF THE INVENTION

Updating existing barcode readers typically requires physically taking the barcode reader out of service, because many barcode readers are not connected to a network in that allows the barcode reader to receive updated features, such as software updates. Upon taking the barcode reader out of service, the barcode reader is connected to a scanner management system, typically via Universal Serial Bus (USB). During this time, the barcode reader is unusable. In addition, there are instances in which the distribution of software features to the barcode readers is conducted under a software license. However, it is difficult to monitor which barcode readers are covered by the software license, and whether the software distribution is in compliance with the software license, much less update the barcode readers with features in accordance with the software license.

Accordingly, there is a need for an improved apparatus and method for updating barcode readers that requires little to no removal from service, with faster, more complete software licensing and monitoring.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
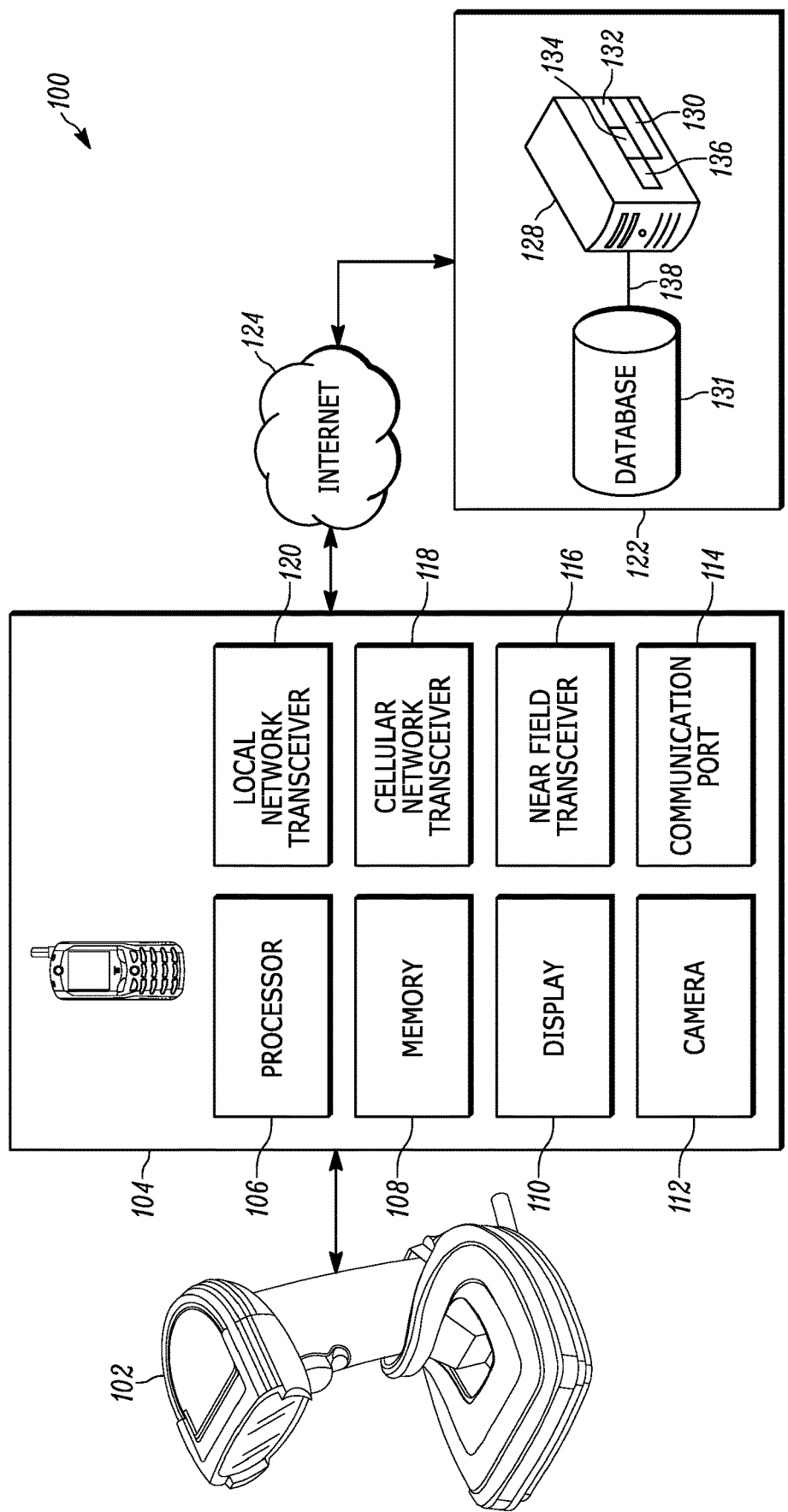
FIG. 1 illustrates a communication system between components according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides a client computing device that includes a housing, a display positioned within the housing, a wireless transceiver, an imaging assembly positioned within the housing and a controller operatively coupled to the imaging assembly. The imaging assembly includes an image sensor, and the image sensor is adapted to capture at least one of: light reflected from a symbol and light emitted from the symbol. The controller is adapted to communicatively couple to a server via a public network using the wireless transceiver, decode a first symbol captured in an image captured by the image sensor, receive activation data from the server in response to transmitting, to the server, the decoded identification data and a request to enable a feature on the image scanning apparatus, and generate an image of a second symbol on the display. The first symbol includes encoded identification data uniquely identifying the image scanning apparatus, and the encoded identification data forms decoded identification data upon decoding the first symbol. The activation data includes activation identification data specific to a license for enabling the feature on the image scanning apparatus. The second symbol includes the activation data encoded in the second symbol.

Another aspect of the present disclosure provides an image scanning apparatus that includes a housing having a cavity and a window, an imaging assembly positioned within the cavity, and a controller operatively coupled to the imaging assembly. The imaging assembly includes an imager and a field-of-view (FOV) extending through the window. The imager is adapted to capture at least one of: light reflected from a symbol and light emitted from the symbol. The controller includes a processor and a memory. The controller is adapted to decode a first symbol captured in an image captured by the image sensor, query the memory for the feature, enable the feature on the image scanning apparatus using the decoded activation data in response to the feature being stored in the memory, and download the feature from the client computing device into the memory using the decoded activation data in response to the feature not being stored in memory. The first symbol includes encoded activation data rendered on a display of a client computing device. The activation data includes activation identification data specific to a license for enabling a feature on the image scanning apparatus, and the encoded activation data forms decoded activation data upon decoding the first symbol.

Yet another aspect of the present disclosure provides a method that includes capturing, via an imaging assembly of a client computing device, an image of a first symbol, decoding, via a processor of the client computing device, the first symbol captured in the image, generating, via the processor of the client computing device, a request to enable a feature on the client image scanning apparatus, receiving, via a wireless receiver of the client computing device, activation data from a server in response to transmitting the decoded identification data and the request, and generating, on a display of the client computing device, an image of a second symbol in response to the receipt of the activation data. The first symbol includes encoded identification data that uniquely identifies a client image scanning apparatus. The encoded identification data forms decoded identification data upon decoding the first symbol. The activation data includes activation identification data specific to a license for enabling the feature on the image scanning apparatus. The second symbol includes the activation data encoded in the second symbol forming encoded activation data.

Referring now to the drawings, FIG. 1 illustrates various aspects of an exemplary architecture implementing a system 100 for enabling and/or uploading features on a barcode reader, including, but not limited to, software applications, software features, firmware updates, etc. More specific examples of the features include, but are not limited to, software for decoding different symbologies (e.g., unique device identification), software for optical character recognition, software for parsing information on a driver's license, and software for reading multiple barcodes on a single surface. The high-level architecture includes both hardware and software applications, as well as various data communications channels for communicating data between the various hardware and software components. The system 100 for enabling and/or uploading features on a barcode reader may include various software and hardware components or modules.

The system 100 for enabling and/or uploading features on a barcode reader includes front end components, including a barcode reader 102 and a client computing device 104. The client computing device 104 may include a personal computer, a smart phone, a tablet computer, a smart watch, a head mounted display, a wearable computer or other suitable client computing device. The client computing device 104 includes various components that are operatively coupled to one another, including a controller, which includes microcontroller or a processor 106, a program memory 108, a display 110 and an imaging assembly 112, such as a camera, having an image sensor, all of which are interconnected via an address/data bus (not shown). The processor 106 of the client computing device 104 executes instructions stored in the memory 108 to: 1) generate images on the display 110 and 2) capture images via the imaging assembly 112. In particular, the controller 106 executes computer-executable instructions stored in the memory 108 to capture images of symbols, such as barcodes, and decode the symbols captured by the imaging assembly 112 in order to decode information encoded within the symbol. Examples of such instructions include QR code reader applications and barcode reader applications. It should be appreciated that although FIG. 1 depicts only one processor 106, the controller may include multiple processors 106. Similarly, the memory 108 of the controller may include multiple RAMs and multiple program memories storing one or more corresponding server application modules, according to the controller's particular configuration. The memory 108 may be implemented in a known form of computer storage media, including but not limited to, semiconductor memories, magnetically readable memories, and/or optically readable memories, for example, but does not include transitory media such as carrier waves.

The client computing device 104 also includes various communication components, including a hardwire communication port 114, such as a Universal Serial Bus (USB), and/or a wireless nearfield transceiver 116, such as a Bluetooth® transceiver, for communicating with other front end components such as the barcode reader 102. Further, the client computing device 104 includes a cellular network transceiver 118 and/or a local network transceiver 120, such as a WiFi transceiver based on IEEE (Institute of Electrical and Electronics Engineers) 802.11 standards, for communicating with backend components 122 via a public computer network 124.

In an embodiment, the processor 106 of the client computing device 104 executes instructions to manage and transmit data to the backend components 122 via the computer network 124, such as data decoded from a symbol captured in an image by the imaging assembly 112. More particularly, the decoded data may include identification data that uniquely identifies front end components such as the barcode reader 102. Examples of identification data include a serial number associated with the front end component and a model number of the front end component. The processor of the client computing device 104 may further execute instructions to manage and receive data from the back end components 122 via the computer network 124, such as activation data for activating an un-enabled feature residing on the barcode reader 102 or data for the feature itself to be downloaded to the barcode reader 102.

The computer network 124 may be a network such as the Internet or other type of suitable network (e.g., local area network (LAN), a metropolitan area network (MAN), a wide area network (WAN), a mobile, a wired or wireless network, etc.). The computer network 124 may also be one or more cellular networks such as code division multiple access (CDMA) network, GSM (Global System for Mobile Communications) network, WiMAX (Worldwide Interoperability for Microwave Access) network, Long Term Evolution (LTE) network, etc. The processor 106 of the client computing device 104 may also execute one or more applications to perform the tasks discussed above.

The back end components 122 may include a data server 128 and an account database 131. The back end components 122 may communicate with each other through a communication network 138 such as a local area network or other type of suitable network (e.g., the Internet, a metropolitan area network (MAN), a wide area network (WAN), a mobile, a wired or wireless network, a private network, a virtual private network, etc.).

The system for enabling and/or uploading features on a barcode reader 102 in general, and the data server 128 in particular, includes computer-executable instructions 130. A processor of the data server 128 executes the instructions 130 to instantiate an access tool 132, a retrieval tool 134 and an analysis tool 136. The access tool 132 receives data from the client computing device 104 and saves the data to one or more databases, such as the account database 131. The retrieval tool 134 retrieves data from the account database 131 or uses an account identifier to access customer account information from the account database 131 relating to licenses for barcode readers owned or leased by the customer, and licensed features for each of the barcode readers. The account database 131 may be a data storage device such as random-access memory (RAM), hard disk drive (HDD), flash memory, flash memory such as a solid state drive (SSD), etc. The analysis tool 136 may perform one or more analyses on the customer account data and/or requests from the client computing device 104 before providing activation data to activate a feature on the barcode reader 102.

Figure 2:
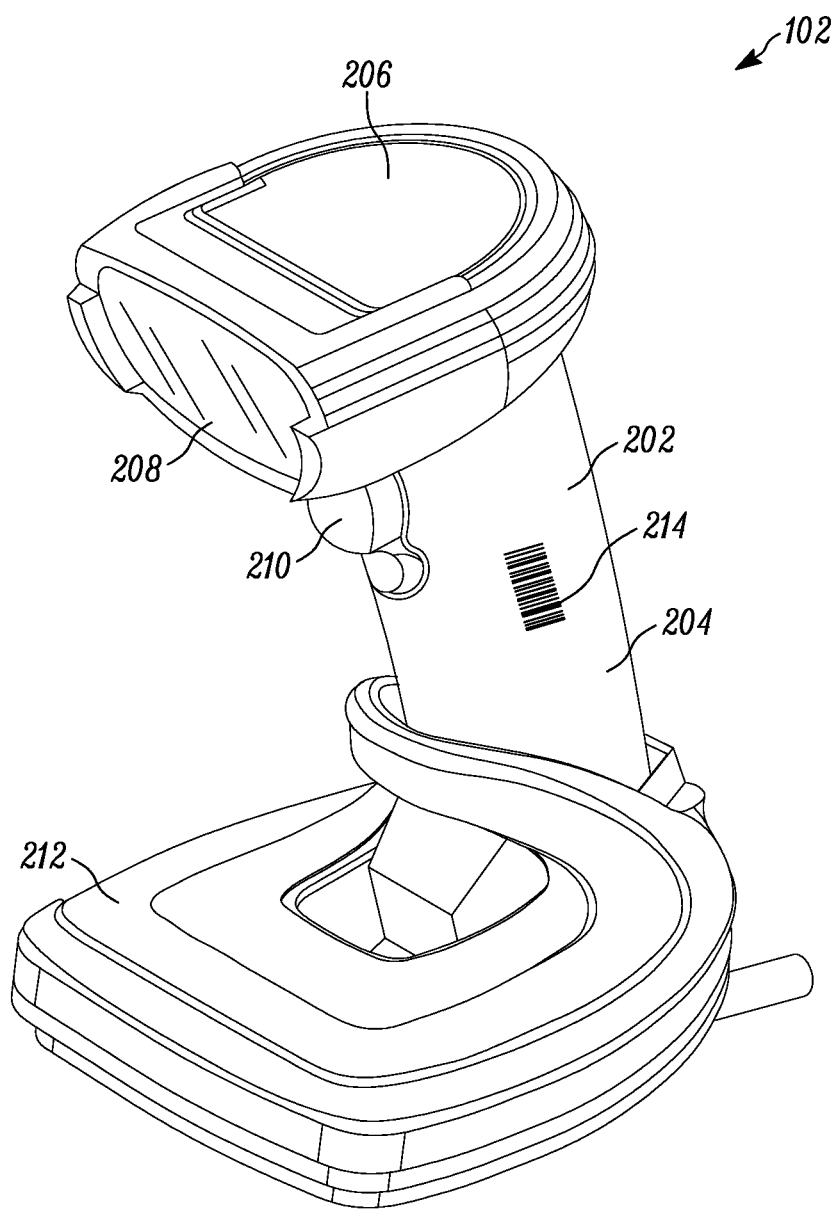
FIG. 2 illustrates a perspective view of a barcode reader of FIG. 1 according to an embodiment of the present invention.

FIG. 2 illustrates an exemplary barcode reader 102 having a housing 202 with a handle portion 204, also referred to as a handle 204, and a head portion 206, also referred to as a scanning head 206. The head portion 206 includes a window 208, and is configured to be positioned on the top of the handle portion 204. The handle portion 204 is configured to be gripped by a reader user (not shown) and includes a trigger 210 for activation by the user. Included in the embodiment is also a base 212 attached to the handle portion 204 opposite the head portion 206. The base 212 is configured to stand on a surface and support the housing 202 in a generally upright position. The barcode reader 102 can be used in a hands-free mode as a stationary workstation when it is placed on the countertop. The barcode reader 102 can also be used in a handheld mode when it is picked up off the countertop and held in an operator's hand. In the hands-free mode, products can be slid, swiped past, or presented to the window 208. In the handheld mode, the barcode reader 102 can be moved towards a barcode on a product, and the trigger 210 can be manually depressed to initiate imaging of the barcode. In some implementations, the base 212 can be omitted, and the housing 202 can also be in other handheld shapes. Other implementations may provide only handheld or only hands-free configurations.

As shown on the handle 204 of the barcode reader 102, a symbol 214, such as a barcode, is provided. It will be understood that the symbol 214 on the handle is exemplary, and the symbol 214 may be provided accordingly to any of a variety of symbologies, such as direct part marking, QR, etc. The symbol 214 encodes data that uniquely identifies the barcode reader 102 from other barcode readers. In an embodiment, the symbol 214 encodes the serial number and model number of the barcode reader 102.

Figure 3:
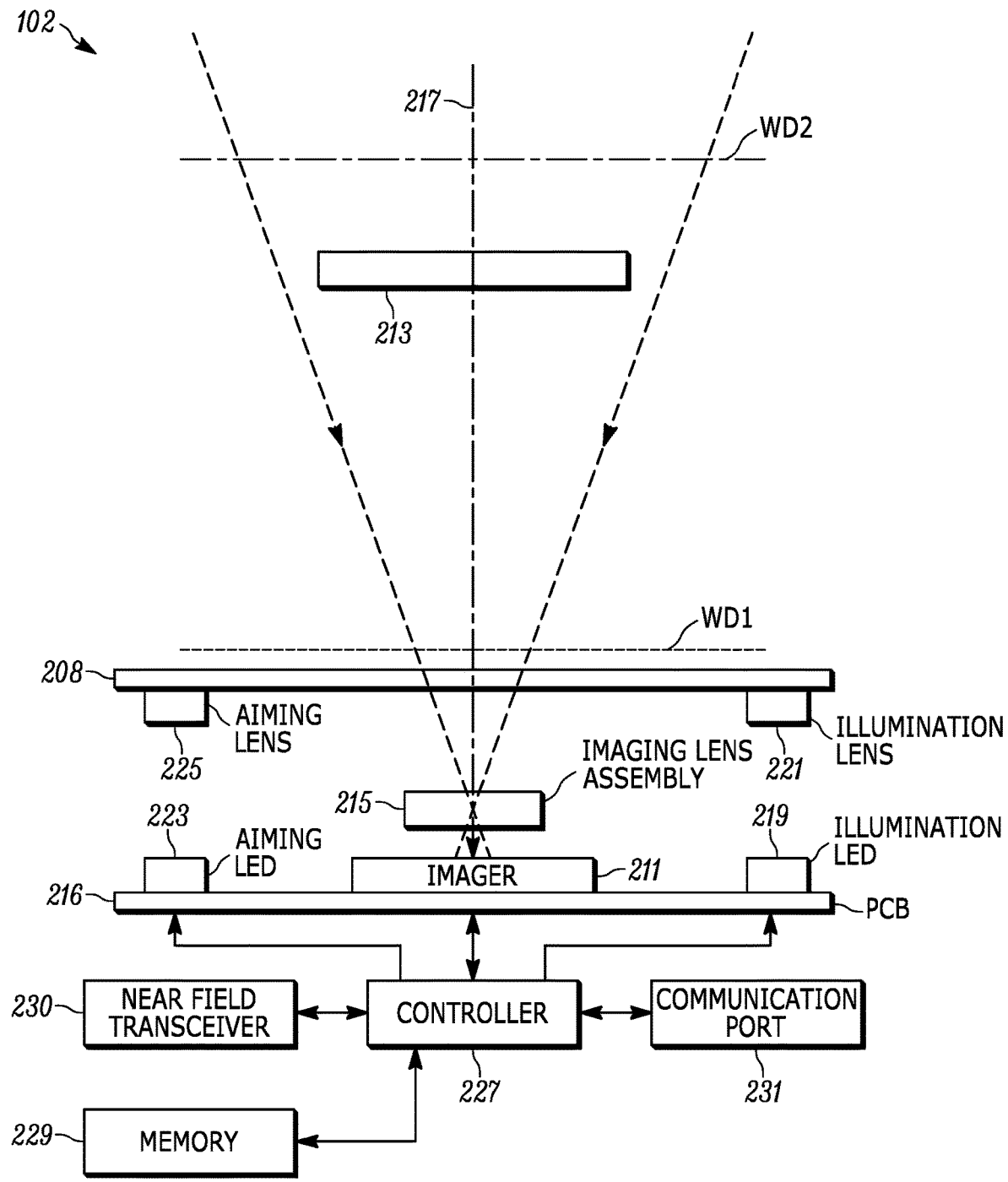
FIG. 3 illustrates a block schematic diagram of some of the components of the barcode reader of FIG. 1 according to an embodiment of the present invention.

FIG. 3 illustrates a block schematic diagram of a portion of a barcode reader 102 in accordance with some embodiments. It should be understood that FIG. 3 is not drawn to scale. Referring to FIG. 3, an imaging assembly includes a light-detecting sensor or image sensor 211 operatively coupled to, or mounted on, a printed circuit board (PCB) 216 in the reader 102. In an embodiment, the image sensor 211 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 215 over a field of view along an imaging axis 217 through the window 208. The return light is scattered and/or reflected from the target 213 over the field of view. The imaging lens assembly 215 is operative for focusing the return light onto the array of image sensors to enable the target 213 to be read. The target 213 may be located anywhere in a working range of distances between a close-in working distance (WD1) and a far-out working distance (WD2). In a preferred embodiment, WD1 is about one-half inch from the window 208, and WD2 is about thirty inches from the window 208.

An illuminating light assembly is also mounted in the imaging reader 102. The illuminating light assembly includes an illumination light source, such as at least one light emitting diode (LED) 219 and at least one illumination lens 221, and preferably a plurality of illumination LEDs and illumination lenses, configured to generate a substantially uniform distributed illumination pattern of illumination light on and along the target 213 to be read by image capture. At least part of the scattered and/or reflected return light is derived from the illumination pattern of light on and along the target 213.

An aiming light assembly is also mounted in the imaging reader 102 and preferably includes an aiming light source 223 (e.g., one or more aiming LEDs), and an aiming lens 225 for generating and directing a visible aiming light beam away from the reader 102 onto the symbol 213. The aiming light beam has a cross-section with a pattern, for example, a generally circular spot or cross-hairs for placement at the center of the symbol 213, or a line for placement across the symbol 213, or a set of framing lines to bound the field of view, to assist an operator in visually locating the symbol 213 within the field of view prior to image capture. The client computing device 104 also includes various communication components, including a wireless nearfield transceiver 230, such as a Bluetooth® transceiver, and/or a hardwire communication port 231 such as a Universal Serial Bus (USB), for communicating with the client computing device 104.

As also shown in FIG. 3, the image sensor 211, the illumination LED 219, the aiming LED 223, the nearfield transceiver 230, and the communication port 231 are operatively connected to a controller or programmed microprocessor 227 operative for controlling the operation of these components. A memory 229 is connected and accessible to the controller 227. Preferably, the microprocessor 227 is the same as the one used for processing the captured return light from the illuminated target 213 to obtain data related to the target 213. More particularly, the microprocessor 227 is the same as the one used to communicate with the client computing device 104, including processing captured return or emitted light from an illuminated target 213 displayed on the display screen of the client computing device to obtain data related to the target 213, as well as communicating with one or more corresponding transceivers of the client computing device 104 via the nearfield transceiver 230 and/or the communication port 231.

Figure 4:
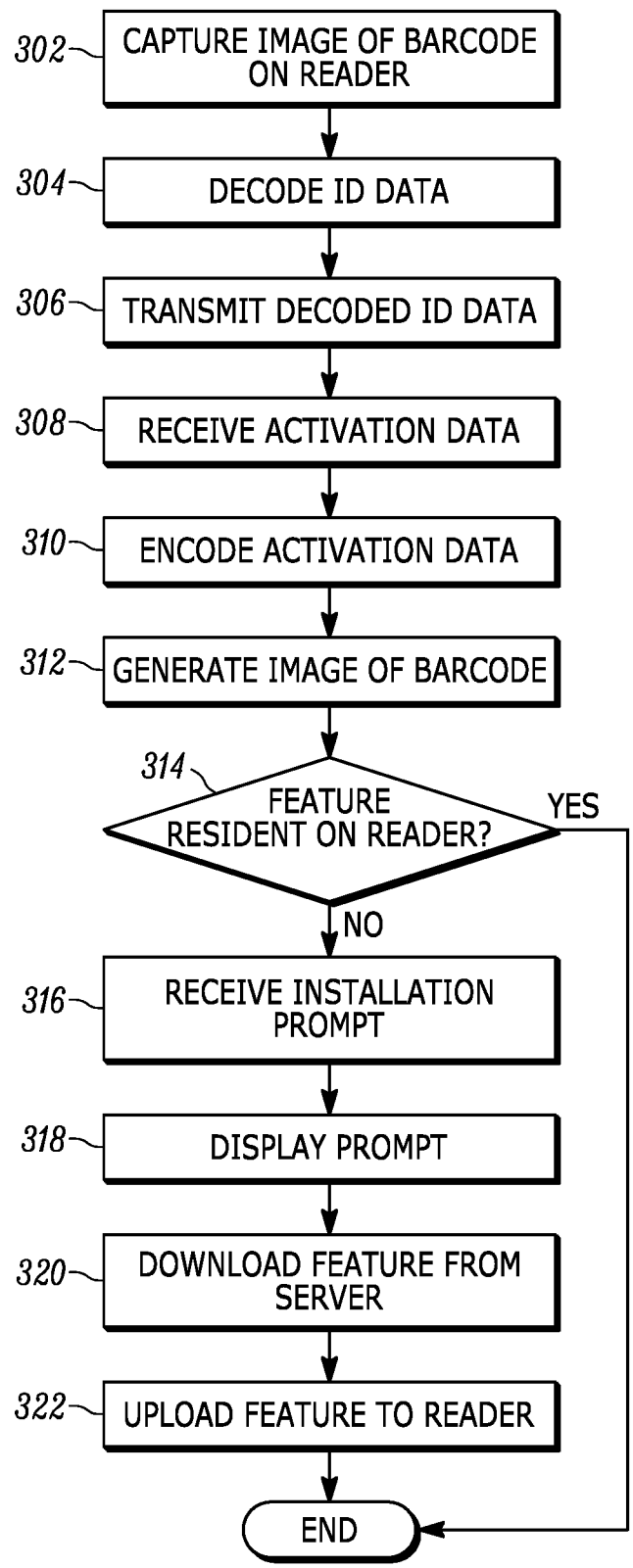
FIG. 4 is a flowchart of a method of updating features on the barcode reader as executed by the smartphone of FIG. 1 in accordance with some embodiments.

FIG. 4 is a flowchart of the control of the client computing device 104 for enabling and/or uploading features on the barcode reader 102 in the embodiments that have been described herein. Turning now to the flowchart of FIG. 4, when a feature is to be enabled and/or uploaded on the barcode reader 102, the imaging assembly 112 of the client computing device 104 captures an image of the symbol 214 on the barcode reader 102 at block 302. As mentioned above, the symbol 214 is a symbology type, such as a barcode, that encodes data uniquely identifying the barcode reader 102, for example by serial number and/or model number. At block 304, the controller of the client computing device 104 decodes the symbol as captured in the image of the symbol using a decode approach, such as a decode algorithm, stored within the memory 108 of the client computing device 104, and executed by the memory of the client computing device 106 so as to decode the identification data encoded in the symbol 214.

At block 306, the client computing device 104 establishes a connection with the backend components 122, such as the server 128, via the network 124. The client computing device 104 communicates via the network 124 using the local wireless transceiver 120 or the cellular network transceiver 118, depending on whether WiFi service or cellular service is available for the client computing device 104, and depending on the settings on the client computing device 104 for communicating with backend components. In an embodiment, the client computing device 104 accesses a webpage hosted and/or operated by the server 128, from which the client computing device 104 may request enablement of a feature on the barcode reader 102 and/or download a feature for the barcode reader 102 from the server 128. In a further embodiment, the webpage requires authentication from the user of the client computing device 104 prior to further interaction with the server 128.

Upon establishing communication with the server 128, the client computing device 104 transmits the identification data as decoded from the image of the symbol 214 on the barcode reader 102 to the server 128 via the network 124. Along with the transmission of the identification data, the client computing device 104 transmits a request to the server 128 for the desired feature to be enabled or installed on the barcode reader 102. In an embodiment, the request may take the form of a query to the server 128 for permission to enable a feature on the barcode reader 102 as identified by the identification data, and a request to enable this feature upon confirmation of the permission from the server 128. As will be discussed further below, the confirmation (or denial) may be based on whether or not such a feature is available under a license for the barcode reader 102.

Provided the barcode reader 102 has permission to utilize the requested feature, at block 310 the client computing device 104 receives activation data from the server 128. As discussed further below, the activation data is used to enable the requested feature that resides in the memory of the barcode reader 102, but is disabled. In an embodiment, the activation data may be an activation code unique to the requested feature as well as identification of the feature that is used by the barcode reader 102 to enable the feature, where the feature already resides in the memory 229, and is disabled but for entry of the activation code.

In response to receiving the activation code from the server 128, the client computing device 104 encodes the activation data into a symbol at block 310. In an embodiment, the symbol with the encoded activation data may be according to the same symbology type as the symbol 214 on the barcode reader 102. Preferably, however, the symbology type used to encode the activation data is one that is recognized by the barcode reader 102. That is, the barcode reader 102 has a decode approach (e.g., decode algorithm) to decode the symbology type used to encode the activation data.

At block 312, the client computing device 104 generates an image of the symbol encoding the activation data on the display 110 in accordance with the symbology type used to encode the activation data. In displaying the symbol, the image sensor 211 of the barcode reader 102 is able to capture an image of symbol as provided on the display of 110 of the client computing device 104.

Following the display of the symbol at block 312, the client computing device 104 waits thereafter for a predetermined amount of time for feedback from the barcode reader 102 via the nearfield transceiver 116 or via the communication port 114. In an embodiment, the barcode reader 102 provides verification that an image of the symbol has been captured, successfully decoded and/or that the feature for which the authentication data is provided is resident on the barcode reader 102. If such verification is provided, or the predetermined threshold is met such that the client computing device 104 may presume that the feature is resident on the barcode reader 102, the client computing device 104 may cease operations for enabling the feature on the barcode reader 102.

On the other hand, the client computing device 104 receives an indication from the barcode reader 102 via the nearfield transceiver 116 or communication port 114 that the feature does not reside on the barcode reader 102 at block 316, and must be downloaded. In an embodiment, the indication may be provided by the barcode reader 102 as a prompt to install the feature corresponding to the authentication data.

In response to receiving the indication from the barcode reader 102, the client computing device 104 displays a prompt on the display 110 for the user to download the feature from the server 128 at block 318. Upon enabling the prompt, the client computing device 104 downloads the feature from the server 128 at block 320. In an embodiment, the client computing device 104 transmits a request to the server 128 via the local network transceiver 120 or cellular network transceiver 118 to download the feature to the server 128. In response to the request, the server 128 transmits data for installation of the feature to the client computing device 104, and the client computing device 104 downloads the data for installation of the feature via the local network transceiver 120 or the cellular network transceiver 118. At block 322, the client computing device 104 uploads the data for the feature to the barcode reader 102 via the nearfield transceiver 116 or the communication port 114 for installation.

Figure 5:
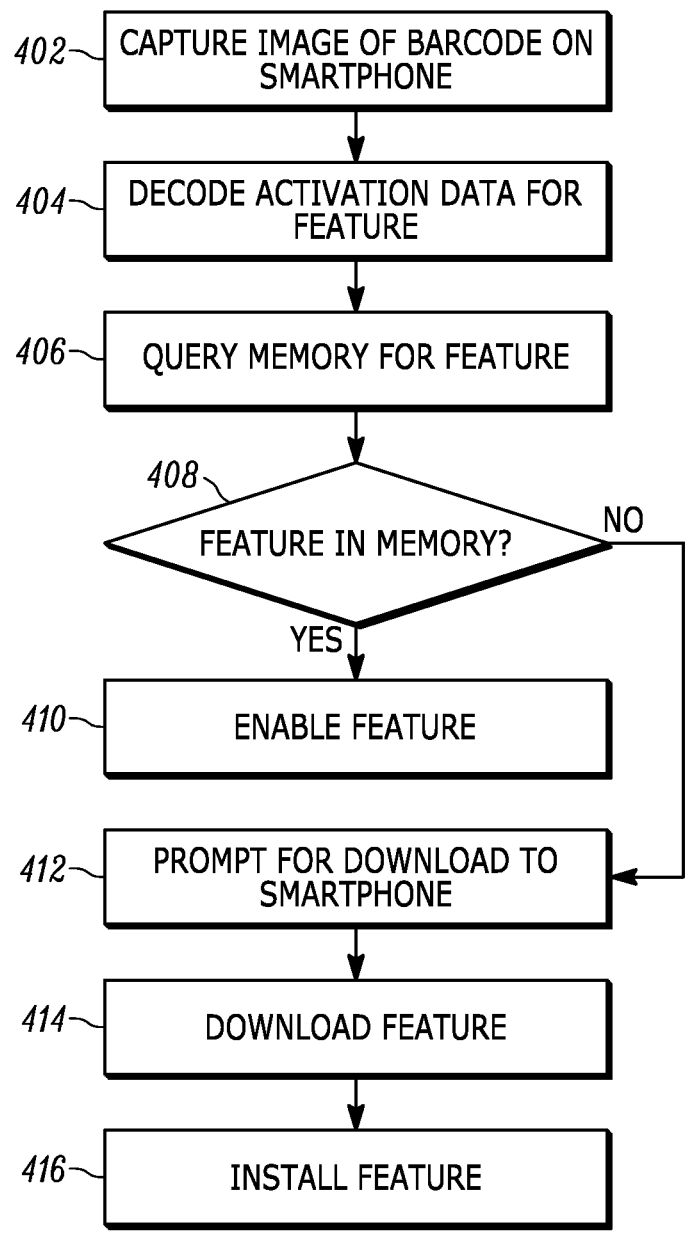
FIG. 5 is a flowchart of a method of updating features on the barcode reader as executed by the barcode reader of FIG. 1 in accordance with some embodiments.

FIG. 5 is a flowchart of the control of the barcode reader 102 for enabling and/or downloading features on the barcode reader 102 in the embodiments that have been described herein. Turning now to the flowchart of FIG. 5, when the client computing device 104 generates an image of the symbol encoding the authentication data on the display 110, the image sensor 211 of the barcode reader 102 captures an image of the symbol at block 402. The target 213 for the barcode reader 102 in this instance is the symbol displayed on the client computing device 104. The aiming LED 223 is activated such that the barcode reader 102 may be aimed at the target 213, and the illumination LED 219 is activated to illuminate the target 213. The image sensor 211 then captures an image of the target 213.

At block 404, the controller 227 utilizes a decode algorithm stored in the memory 229 corresponding to the symbology type of the symbol displayed on the client computing device 104 to decode the image of the symbol as captured by the image sensor 211. In particular, the image of the symbol is decoded so as to decode the activation data encoded within the symbol. As mentioned above, the activation data, once decoded, may include identification of the feature to be enabled and an activation code for activating the feature. Using the identification of the feature to be enabled, the controller 227 queries the memory 229 at block 406 to determine whether the feature already resides on the barcode reader 102.

If the feature is stored, though disabled, in the memory 229 as determined at block 408, the controller 227 utilizes the authentication code to enable the feature at block 410. Thereafter, the barcode reader 102 is able to utilize the feature, at least insofar as provided by the authentication code. On the other hand, if the feature does not reside in the memory 229, the controller 227 may generate an indication at block 412 and transmit the indication to the client computing device 104 via the nearfield transceiver 116 or communication port 114. In an embodiment, the indication is provided as a prompt for the client communication device 104 to download the feature from the server 128.

Once the client computing device 104 has downloaded (or begun to download) the feature from the server 128, at block 414 the barcode reader 102 downloads the feature from the client computing device 104 via the nearfield transceiver 230 or the communication port 231 if connected via hard-wire communication (e.g., USB cable). Once the feature has been downloaded to the barcode reader 102, the controller 227 installs and enables the feature in the memory 229 at block 416. Thereafter, the barcode reader 102 is able to utilize the feature, at least insofar as provided by the authentication code.

Figure 6:
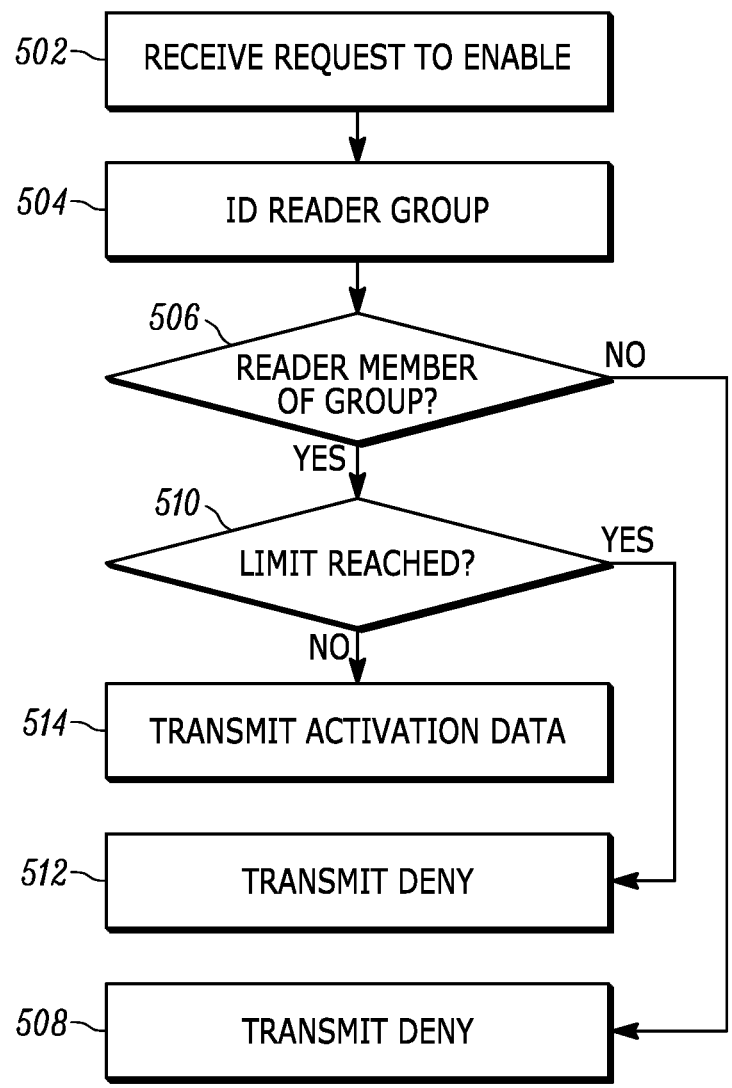
FIG. 6 is a flowchart of a method of updating features on the barcode reader as executed by the server of FIG. 1 in accordance with some embodiments.

FIG. 6 is a flowchart of the control of the server 128 for enabling and/or downloading features on the barcode reader 102 in the embodiments that have been described herein. Turning now to the flowchart of FIG. 6, a receiver of the server 128, such as the access tool 132, receives the request to enable the feature on the barcode reader 102 from the client computing device 104 via the network 124 at block 502.

Typically, a license applies to more than one barcode reader, such that the license covers multiple barcode readers. For example, a license may be limited to a particular number of barcode readers within the group. In a further example, permission to enable a desired feature may be limited to a particular number or threshold of barcode readers in the group that may use the feature. Identification of these barcode readers may be stored as a group (i.e., a given subset of barcode readers) within the database 131, where the subset(s) may be identified according to the barcode readers owned/leased by a customer and/or according to permitted features. As such, when a request to enable a feature is received by the server 128, the server 128 analyzes the identification data uniquely identifying the barcode reader 102 with the analysis tool 136, and then using the identification, identifies the reader group to which the barcode reader 102 belongs at block 504 using the retrieval tool 134. In an embodiment, the identification data uniquely identifying the barcode reader 102 may include data that identifies the group to which the barcode reader 102 belongs.

In order to determine whether the requested feature is permitted for the identified barcode reader 102 under the provisions of the applicable license, at block 504 the server 128, using the analysis tool 136, determines whether the barcode reader 102 is a member of the group or subset identified at block 504. For example, if the group is defined by the barcode readers owned/leased by the entity, this step may verify that the barcode reader 102 identified in the request is, in fact, owned/leased by the entity. In another example, if the group is defined by barcode readers that may enable the requested feature, this step may verify that the barcode reader 102 identified in the request is at least nominally eligible to enable the requested feature. If not, the server 128 may transmit a denial of the request to the client computing device 104 via the network 124 at block 508 using the access tool 132.

On the other hand, if the barcode reader 102 is a member of the group or subset identified at block 504, the server 128 may then determine whether the number of barcode readers allowed to enable the feature has met a predetermined threshold at block 510. For example, as mentioned above, the provisions of the license may limit the number of barcode readers owned/leased by the customer that may enable the requested feature. Accordingly, in order to enable a feature on the barcode reader identified in the request, the server 128 determines whether the number of enabled copies of the feature used by the barcode readers in the group has reached the threshold. If so, the server 128 may transmit a denial of the request to the client computing device 104 via the network 124 at block 512 using the access tool 132. On the other hand, if the threshold has not yet been met, the server 128 may transmit the activation data to the client computing device at block 514 using the access tool 132.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A client computing device comprising:
a housing;
a display positioned within the housing;
a first wireless transceiver;
an imaging assembly positioned within the housing and comprising an image sensor, wherein the image sensor is adapted to capture at least one of: light reflected from a symbol and light emitted from the symbol; and
a controller operatively coupled to the imaging assembly and the first wireless transceiver, the controller adapted to:
communicatively couple to a server via a public network using the first wireless transceiver;
decode a first symbol captured in an image captured by the image sensor, the first symbol comprising encoded identification data uniquely identifying the image scanning apparatus, the encoded identification data forming decoded identification data upon decoding the first symbol;
receive activation data from the server in response to transmitting, to the server, the decoded identification data and a request to enable a feature on the image scanning apparatus, the activation data comprising activation identification data specific to a license for enabling the feature on the image scanning apparatus; and
generate an image of a second symbol on the display, the second symbol comprising the activation data encoded in the second symbol.

2. The client computing device of claim 1, wherein the feature comprises a disabled application stored in a memory of the image scanning apparatus.

3. The client computing device of claim 1, wherein:
the feature comprises an application stored in a memory of the server; and
the controller is further adapted to download the application from the server via the first wireless transceiver in response to an installation prompt from the image scanning apparatus, and upload the application to the image scanning apparatus.

4. The client computing device client computing device of claim 1, wherein the identification data comprises at least one of: a serial number of the image scanning apparatus and a model number of the image scanning apparatus.

5. The client computing device of claim 1, wherein the controller is further adapted to:
query the server to confirm a permission to enable the feature on the image scanning apparatus; and
request to enable the feature on the image scanning apparatus in response to confirmation of permission to enable the feature from the server.

6. The client computing device of claim 1, wherein controller is adapted to communicatively couple to the image scanning apparatus.

7. The client computing device of claim 6, further comprising a second wireless transceiver operatively coupled to the controller, wherein the controller is adapted to communicatively couple to the image scanning apparatus via the second wireless transceiver.

8. The client computing device of claim 7, wherein the second wireless transceiver comprises a nearfield wireless transceiver.

9. The client computing device of claim 6, further comprising a communication port operatively coupled to the controller, wherein the controller is adapted to communicatively couple to the image scanning apparatus using a wired connection via the communication port.

10. An image scanning apparatus comprising:
a housing having a cavity and a window;
an imaging assembly positioned within the cavity, the imaging assembly having an imager and a field-of-view (FOV) extending through the window, the imager adapted to capture at least one of: light reflected from a symbol and light emitted from the symbol; and
a controller operatively coupled to the imaging assembly, the controller having a processor and a memory, wherein the controller is adapted to:
decode a first symbol captured in an image captured by the image sensor, the first symbol comprising encoded activation data rendered on a display of a client computing device, the activation data comprising activation identification data specific to a license for enabling a feature on the image scanning apparatus, the encoded activation data forming decoded activation data upon decoding the first symbol;
query the memory for the feature;
enable the feature on the image scanning apparatus using the decoded activation data in response to the feature being stored in the memory; and
download the feature from the client computing device into the memory using the decoded activation data in response to the feature not being stored in memory.

11. The image scanning apparatus of claim 10, wherein the feature comprises a disabled application stored in the memory.

12. The image scanning apparatus of claim 10, further comprising a wireless transceiver operatively coupled to the controller, wherein the controller is adapted to communicatively couple to the client computing device via the wireless transceiver.

13. The image scanning apparatus of claim 12, wherein the wireless transceiver comprises a nearfield wireless transceiver.

14. The image scanning apparatus of claim 10, further comprising a communication port operatively coupled to the controller, wherein the controller is adapted to communicatively couple to the client computing device using a wired connection via the communication port.

15. A method comprising:
capturing, via an imaging assembly of a client computing device, an image of a first symbol;
decoding, via a processor of the client computing device, the first symbol captured in the image, wherein the first symbol comprises encoded identification data that uniquely identifies a client image scanning apparatus, the encoded identification data forming decoded identification data upon decoding the first symbol;
generating, via the processor of the client computing device, a request to enable a feature on the client image scanning apparatus;
receiving, via a wireless receiver of the client computing device, activation data from a server in response to transmitting the decoded identification data and the request, the activation data comprising activation identification data specific to a license for enabling the feature on the image scanning apparatus, and
generating, on a display of the client computing device, an image of a second symbol in response to the receipt of the activation data, the second symbol comprising the activation data encoded in the second symbol forming encoded activation data.

16. The method of claim 15, further comprising:
querying, via a wireless transmitter of the client computing device, the server to confirm a permission to enable the feature on the client image scanning apparatus; and
requesting, via the wireless transmitter of the client computing device, to enable the feature on the image scanning apparatus in response to confirmation of permission to enable the feature from the server.

17. The method of claim 15, further comprising:
capturing, via an imaging assembly of the client image scanning apparatus, an image of the second symbol displayed on the client computing device;
decoding, via a processor of the client image scanning apparatus, the second symbol, wherein the encoded activation data forms decoded identification data upon decoding the second symbol; and
enabling, via a processor of the client image scanning apparatus, the feature on the image scanning apparatus in response to decoding the second symbol.

18. The method of claim 15, wherein the feature comprises an application stored in a memory of the server, and the activation data comprises data to enable the client image scanning apparatus to install the application, the method further comprising:

scanning, via a processor of the client image scanning apparatus, a memory of the client image scanning apparatus for the application in response to decoding the second symbol;
prompting, via a transmitter of the client image scanning apparatus, the client computing apparatus to download the application in response to the application not being in the memory of the client image scanning apparatus;
downloading, via a receiver of the client image scanning apparatus, the application from the client computing device; and
installing, via the processor of the client image scanning apparatus, the application in the memory.

19. The method of claim 18, further comprising:
generating, via a processor of the client computing device, an installation prompt on the display of the client computing device in response to the request from the client image scanning apparatus;
downloading, via a wireless receiver of the client computing device, the application from the server in response to an installation prompt from the client image scanning apparatus;
transmitting, via a transmitter of the client computing device, a request to the server to download the application; and
uploading, via the client computing device, the application to the client image scanning apparatus.

20. The method of claim 19, further comprising:
receiving, via a receiver of the server, the request from the client computing device; and
uploading, via a transmitter of the server, the application to the client computing device in response to the request from the client computing device.

21. The method of claim 15, further comprising:
receiving, via a receiver of the server, the identification data and the request to enable the feature on the client image scanning apparatus;
identifying, via a processor of the server, a given subset of image scanning apparatuses of which the client image scanning apparatus is a member using the identification data, the given subset being associated with a permission to use a threshold number of copies of the feature;
retrieving, via a processor of the server, activation data associated with the requested feature in response to: 1) the client image scanning apparatus being identified as a member of the given subset, and 2) the number of copies of the feature used by the given subset being less than the threshold number; and
transmitting, via a transmitter of the server, the activation data to the client computing device.

* * * * *